United States Patent [19]
Nicholas

[11] 4,441,745
[45] Apr. 10, 1984

[54] COUPLING PIPE PART FOR INTERCONNECTING CORRUGATED PIPE PARTS

[75] Inventor: Terry G. Nicholas, Twyford, England

[73] Assignee: Wavin B.V., Zwolle, Netherlands

[21] Appl. No.: 533,632

[22] Filed: Sep. 20, 1983

Related U.S. Application Data

[63] Continuation of Ser. No. 293,952, Aug. 18, 1981.

[30] Foreign Application Priority Data

Aug. 22, 1980 [NL] Netherlands .......................... 8004770

[51] Int. Cl.³ ...................... F16L 21/00; F16L 15/00; F16L 39/00
[52] U.S. Cl. .................................... 285/417; 285/390; 285/319; 285/DIG. 4; 285/DIG. 22
[58] Field of Search ......... 285/390, 417, 423, DIG. 4, 285/DIG. 22, 319, 369

[56] References Cited

U.S. PATENT DOCUMENTS

| | | | |
|---|---|---|---|
| 2,869,099 | 1/1959 | Robinson | 285/DIG. 22 |
| 3,785,682 | 1/1974 | Schaller et al. | 285/DIG. 22 |
| 3,899,198 | 8/1975 | Maroschak | 285/DIG. 4 |
| 4,247,136 | 1/1981 | Fouss et al. | 285/DIG. 4 |
| 4,286,808 | 9/1981 | Fouss et al. | 285/DIG. 4 |

FOREIGN PATENT DOCUMENTS

| | | |
|---|---|---|
| 1989794 | 4/1969 | Fed. Rep. of Germany . |
| 1130575 | 2/1957 | France . |
| 2389823 | 5/1978 | France . |
| 379854 | 9/1964 | Switzerland . |
| 1294859 | 11/1972 | United Kingdom . |
| 1365151 | 8/1974 | United Kingdom ................ 285/423 |

*Primary Examiner*—Richard J. Scanlan, Jr.
*Attorney, Agent, or Firm*—Wilkinson, Mawhinney & Theibault

[57] ABSTRACT

A plastic coupling pipe part for connecting corrugated plastic pipe comprises abutment projections and a radially resilient displaceable lip, carrying an inwardly directed cam. The lip is surrounded by openings delimited by a rectangular incision in the plastic pipe. The transition part connecting the lip with the pipe wall has a smaller width than the end edge of the lip.

In a pipe connection with such a coupling pipe part the coupling cam engages a flank of a wave valley of a corrugated pipe.

6 Claims, 5 Drawing Figures

COUPLING PIPE PART FOR INTERCONNECTING CORRUGATED PIPE PARTS

This application is a continuation of Ser. No. 293,952, filed 8-18-80.

BACKGROUND OF THE INVENTION

1. Field of the Invention

The present invention relates to a coupling pipe part for interconnecting corrugated pipe parts, comprising at least one coupling element located at distance from the end and directed toward the inside of the coupling pipe part.

2. Description of the Prior Art

Coupling pipe parts for interconnecting perforated corrugated pipe parts serving as drain pipes have been used in the art. In a certain type of this known coupling pipe part, the coupling element consists of cams directed toward the inside of the coupling pipe part formed by deforming the wall of the coupling pipe part. In order to couple a corrugated pipe part to such a coupling pipe part, a corrugated pipe part is pressed into the coupling pipe part until at least one transverse corrugation of the corrugated pipe has passed the aforesaid cams.

Coupling pipe parts of such type have the drawback that the cams as provided easily bend in axial direction, as a result of which said corrugated pipe part may be pulled out of the coupling pipe part when great tensile forces are exerted upon a corrugated pipe part connected to such a coupling pipe part.

Another drawback consists in that the manufacture of such a coupling pipe part comprises two steps, i.e. first the shaping of the coupling pipe part and secondly, in a separate step, the shaping of the cams which serve as a coupling element.

In order to overcome said drawbacks, a coupling pipe part has also been proposed in the art having the form of a socket internally provided with deformation cams which compress an entire corrugated pipe and render it somewhat oval, as a result of which an inwardly directed coupling element likewise provided within the coupling pipe part can engage a groove provided between two corrugations of a corrugated pipe and so establishes the connection.

The great drawback of the latter coupling pipe part consists in that the two parts are disconnected when bending forces and tensile forces are exerted upon a corrugated pipe part.

SUMMARY OF THE INVENTION

It is therefore a primary object of the present invention to provide a coupling pipe part of the aforementioned type, in which said drawbacks do not occur, as the present coupling pipe part is able to provide a connecting means having a very great resistance to pull-out forces.

This object is attained according to the present invention in that the coupling element is disposed in a radially resilient displaceable manner.

By the wording "radially resilient" is meant that the coupling element hardly undergoes any axial displacement.

When using such a radially resilient coupling element according to the invention, a corrugated pipe part to be inserted into the coupling pipe part can easily be passed along the radially resilient displaceable coupling element, since in first instance said coupling element moves toward the outside, but thereafter said coupling element will establish a firm engagement with the corrugated pipe part, due to its resiliency.

The coupling element according to the invention comprises a rigid coupling cam being integral with a resilient lip, formed as a result of wall incisions in the coupling pipe part, said lip preferably having at the location of a coupling cam, a larger width than the width of the transition area between said lip and the wall of the coupling pipe part. The transition area between the lip and the coupling pipe part effectively has a rounded shape.

An important advantage of the latter is that no outwardly directed forces can be exerted upon the coupling element which would push the coupling element toward the outside in a resilient way. In addition, it is not possible for the coupling element to bend toward the inside since in such a case the resilient part of the coupling element itself is then supported by a corrugated pipe part.

At one end the coupling pipe part is effectively provided with two coupling elements radially disposed opposite one another and, at the other end, likewise two coupling elements radially disposed opposite one another, said coupling elements being turned over an angle of 90°, however.

Due to the use of a resilient lip having a larger width at the location of the coupling cam than the width of the connection between the lip and the pipe wall, the outwardly directed resilient force of the coupling element remains quite limited, whilst the contact area between the coupling cam and the flank of a corrugation of a corrugated pipe part is favorably influenced.

The center of the coupling pipe part may effectively be provided with abutment means disposed at an angle of 45° relative to all the resilient coupling elements, whereby the coupling pipe part may serve to connect two corrugated pipe parts, the penetration of each corrugated pipe part being limited by the abutment means.

It is furthermore very advantageous that the coupling pipe part according to the invention can be easily manufactured in a short time while comprising a very uniform wall thickness. This may be achieved, for example, in that the separation of the core parts for forming a coupling pipe part according to the present invention is formed over the abutment means and over the radially displaceable coupling elements in the form of resilient lips with rigid cams. Such a separation ensures that, after forming the coupling pipe part, the core can be easily pulled out of the product.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF A PREFERRED EMBODIMENT

Figure 1:
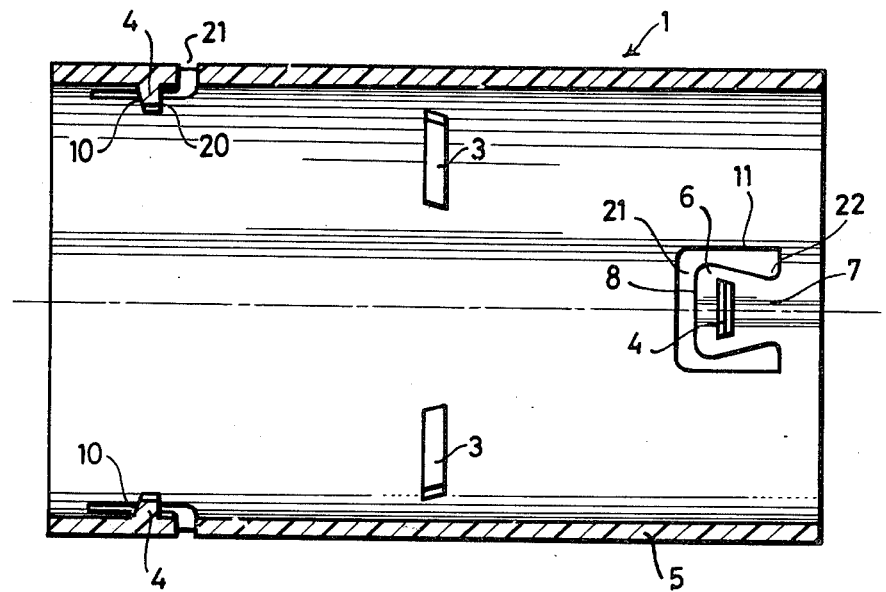
FIG. 1 is a sectional view of a coupling pipe part according to the invention in longitudinal direction.
Figure 2:
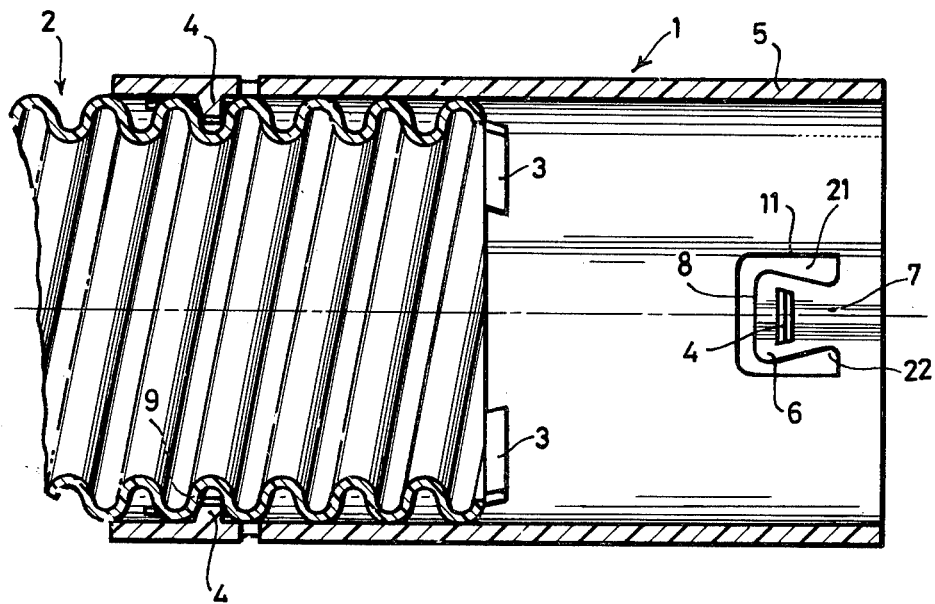
FIG. 2 is the same coupling pipe part after having inserted at least one corrugated pipe part.

Referring now to FIG. 1 a coupling pipe part 1 made of a thermoplastic plastic, such as polyvinyl chloride, is destined to interconnect corrugated pipe parts 2 (FIG. 2). This coupling pipe part 1 has the shape of a socket centrally provided with four abutment cams 3 evenly distributed over the circumference.

At each end of the socket-shaped coupling pipe part 1 there are located diametrically opposed coupling elements in the form of rigid coupling cams 4, resiliently disposed on lips 6 affixed to the pipe wall 5 of the coupling pipe part. The lip 6 is formed by providing recesses 21 (FIG. 2) in the pipe wall on three sides of the lip 6. The lip 6 is connected with the pipe wall 5 by means of a transition part 7 provided with roundings 22. It will be evident that the radius of curvature and the thickness of lip 6 are identical with those of the pipe wall, as the lip has been formed from the pipe wall 5 of the coupling pipe part 1.

As can be seen, the width of the transition part 7, with which the lip 6 is connected to the pipe wall 5, is smaller than the width of the end edge 8 of lip 6.

In so forming the lip, the outwardly directed resilient force of the lip is quite limited, whereas the contact area between the rigid cam 4 and a flank 9 of a corrugated pipe part 2 is substantially increased (FIG. 2).

The cams 4 comprise a radially inwardly directed back face 20, which ensures an optimum coupling between the coupling cams 4 and a corrugated pipe 2.

On the other side, a coupling cam 4 is advantageously provided with a front face 10 slanting toward the inside of the coupling pipe part, as a result of which a corrugated pipe part 2 to be inserted into the coupling pipe part 1 can easily pass the coupling cam 4, due to the radial outward displacement of the coupling element in the form of the lip 6 with the coupling cam 4.

The lips 6 with coupling cams 4 located at one end of the coupling pipe part are preferably each disposed symmetrically in relation to two abutment cams 3.

At the other end of the coupling pipe part, the lips 6 with coupling cams 4 are so disposed as to be turned by 90°.

As is apparent, the incision 11 in the pipe wall 5 of the coupling pipe part 1 about three sides of lip 6 is rectangular.

Figure 3:
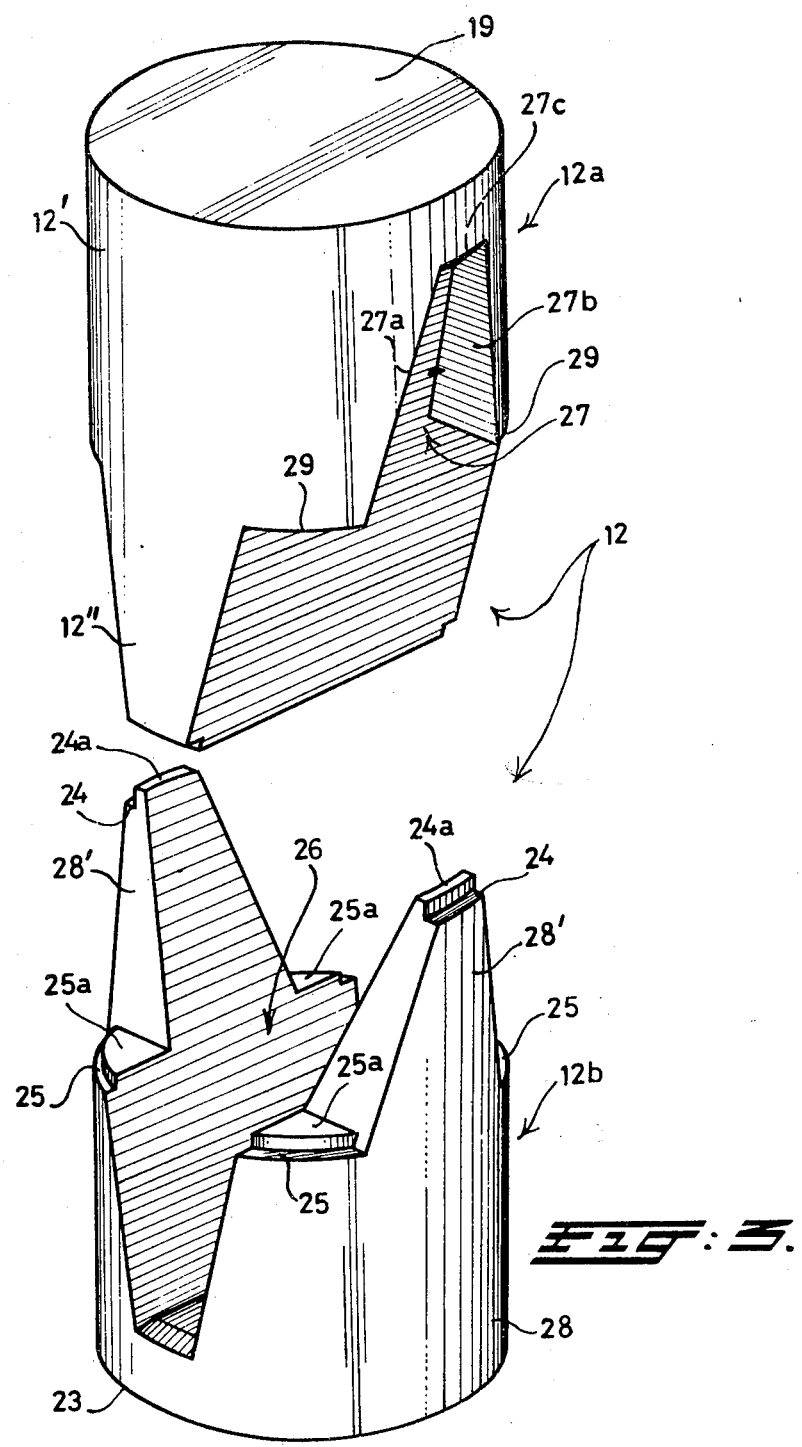
FIG. 3 shows two core parts of a core for forming a coumpling pipe part according to the invention.

For purposes of manufacturing a coupling pipe part according to the present invention it is advantageous to use a core 12 consisting of core parts 12a and 12b (FIG. 3).

Referring now to FIG. 3 core part 12a comprises a cylindrical upper part 12' and a tapered lower part 12'', two diametrically opposed, upwardly tapered first core-part recesses 27 being provided in the upper part, having conical core-part-recess side walls 27a, 27b and a core-part-recess upper wall 27c.

Next to the recess 27 there are located the bounding areas 22 (FIGS. 1 and 2).

The other core part 12b comprises a cylindrical lower part 28 and an upper part that consists of two diametrically opposed core-part projections 28' conically extending toward the end comprising an upper edge 24a. Next to the upper edge 24a the core-part projections 28' are provided on the outside with a recess having a lower edge 24. The core part 12b also comprises a central cavity 26.

On both sides of each core-part projection 28' there are located the upper faces 25a of the lower part 28, there being located on the outside also recesses with a lower face 25.

Figure 4:
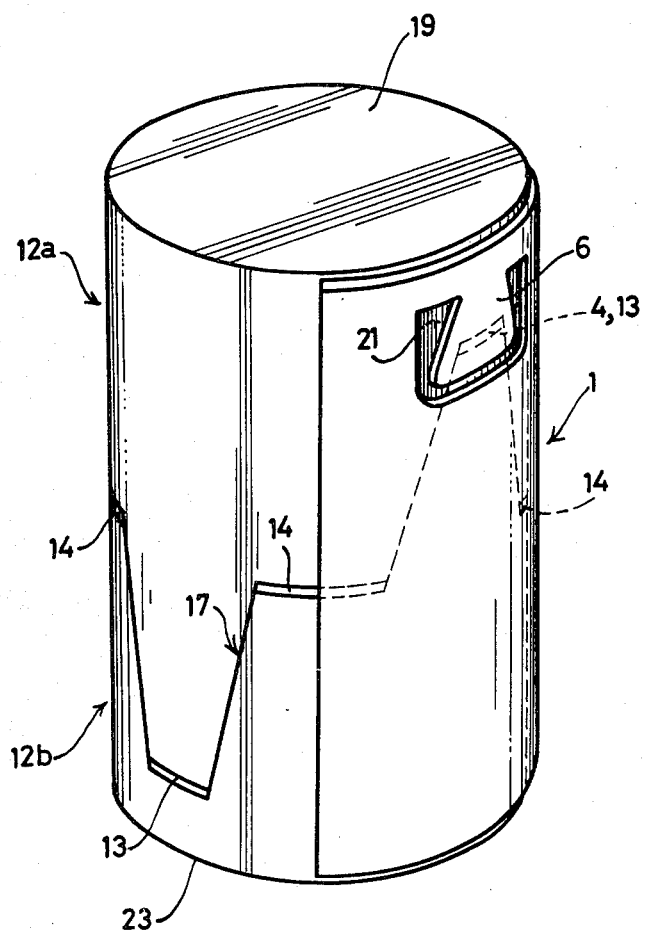
FIG. 4 is a core composed of the two core parts after fitting them together with a part of a coupling pipe part according to the invention.

Referring now to FIG. 4 fitting the core parts 12a and 12b into each other results in a core being formed having a partial line 17. The co-operation of the upper faces 27c of the core recesses 27 with the upper edges 24a produces recesses 13 in the core which are provided for the forming of the coupling cams 4 on the lips 6.

On the other hand, there are produced other recesses 14 bounded by lower faces 25 of core part 12b and bouding faces 22 of core part 12a. The recesses 14 are provided for forming the abutment cams 3 (FIGS. 1 and 2).

In order to form the recess 21 about the lip 6 in the pipe wall (FIGS. 1 and 2) of the coupling pipe part 1, an outer mold 15 is used provided with inwardly directed mold projections (FIG. 5) which co-operate with the outer wall of the core 12 formed from the core parts 12a and 12b. For a proper removal, the edges of the projections are chamfered, the discussed FIG. 4 further showing a portion of the coupling pipe part as obtained after injection molding.

The shape of the core partial line 17 of the core parts 12a and 12b is such that after injection molding the core parts 12a and 12b can each be pulled out of the coupling pipe part 1 at the ends 19, 23, without any problems with the abutment cams 3 and coupling cams 4 (FIGS. 1 and 2).

Figure 5:
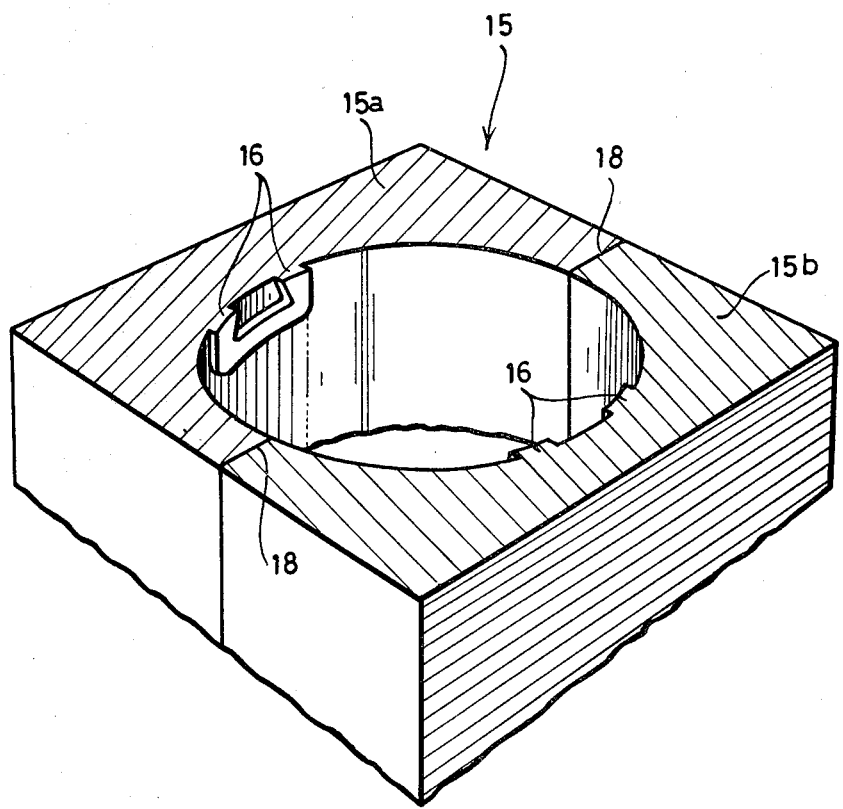
FIG. 5 is a cross-sectional view of a core with an outer mold for forming a coupling pipe part according to the invention.

Referring now to FIG. 5, the partial line 18 of the outer-mold half members 15a, 15b runs across the recesses 14 of the abutment cams 3 (FIG. 4) so that these mold half members can also be removed easily.

A very essential aspect of the coupling pipe part according to the present invention is that in essence the coupling element consisting of lip 6 with cam 4 is secured on the pipe wall surface 5 without any deformation of said pipe wall surface (FIGS. 1 and 2).

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. Pipe connection for corrugated pipes comprising a coupling pipe part slid over the outer side of corrugated pipe parts said coupling pipe part comprising at least one coupling element located at a distance from the end of the pipe part having a cam (4) directed towards the inside of the coupling pipe part, said coupling element comprising a resilient lip (6) carrying said cam and formed in the coupling pipe part (1) by wall slits (11) characterized in that the lip extends axially of the pipe part and the part of said lip (6) provided with said inwardly directed cam has a larger width than the width of the transition area (7) between the lip (6) and the pipe wall (5) of the coupling pipe part (1), said cam (4) being located at a distance from said transition area.

2. A pipe connection according to claim 1, characterized in that a rectangular cutout (11) is provided around the lip, thereby forming a gap (21).

3. A pipe connection according to claim 1, characterized in that the coupling cam (4) is rigid and with the lip (6) and is provided with a front face (10) slanting towards the inside of the coupling pipe part.

4. A pipe connection according to claim 1, characterized in that the coupling pipe part (1) is provided at one end with two coupling elements (4) which are radially disposed opposite each other and at the other end likewise with two coupling elements (4) radially disposed opposite each other which, however, are turned through an angle of 90°.

5. A pipe connection according to claim 1, characterized in that the center of the coupling pipe part (1) is provided with abutment elements (3) disposed at an angle of 45° in relation to a resilient coupling element.

6. A pipe connection according to claim 1, characterized in that the coupling cam (4) of the coupling element is provided with a substantially radial back face (20).

* * * * *